United States Patent [19]

Palazzotto et al.

[11] Patent Number: 4,985,340
[45] Date of Patent: Jan. 15, 1991

[54] ENERGY CURABLE COMPOSITIONS: TWO COMPONENT CURING AGENTS

[75] Inventors: Michael C. Palazzotto; Robert J. DeVoe, both of St. Paul, Minn.

[73] Assignee: Minnesota Mining and Manufacturing Company, St. Paul, Minn.

[21] Appl. No.: 201,572

[22] Filed: Jun. 1, 1988

[51] Int. Cl.$^5$ .................. C08G 18/04; C08G 18/22; C08G 18/32; G03F 7/029

[52] U.S. Cl. ............................. 430/270; 430/280; 430/281; 430/283; 430/288; 430/906; 430/914; 430/916; 522/15; 522/25; 522/66; 522/170; 522/174; 528/51; 528/52; 528/56; 528/75; 528/85

[58] Field of Search .................. 522/25, 15, 174; 430/270, 280, 281, 283, 288; 528/51, 52, 56, 75, 85

[56] References Cited

U.S. PATENT DOCUMENTS

| | | | |
|---|---|---|---|
| 3,705,129 | 12/1972 | Murio et al. | 260/47 |
| 3,709,861 | 1/1973 | Anderson | 260/47 |
| 3,714,006 | 1/1973 | Anderson | 204/159.14 |
| 3,729,313 | 4/1973 | Smith | 96/27 |
| 3,741,769 | 6/1973 | Smith | 96/35.1 |
| 3,794,576 | 2/1974 | Watt | 204/159.11 |
| 3,808,006 | 4/1974 | Smith | 96/88 |
| 3,867,354 | 2/1975 | Betts et al. | 260/78.4 |
| 4,026,705 | 5/1977 | Crivello et al. | 96/27 |
| 4,058,400 | 11/1977 | Crivello | 96/86 |
| 4,080,274 | 3/1978 | Schlesinger | 204/159.18 |
| 4,086,091 | 4/1978 | Cella | 96/36.2 |
| 4,156,035 | 5/1979 | Tsao et al. | 427/44 |
| 4,216,288 | 8/1980 | Crivello | 430/280 |
| 4,227,978 | 10/1980 | Barton | 204/159.12 |
| 4,228,232 | 10/1980 | Rousseau | 430/271 |
| 4,237,242 | 12/1980 | Frankel | 525/119 |
| 4,250,053 | 2/1981 | Smith | 252/426 |
| 4,342,793 | 8/1982 | Skinner et al. | 427/44 |
| 4,428,807 | 1/1984 | Lee et al. | 204/159.14 |
| 4,521,545 | 6/1985 | Kerimis et al. | 521/187 |
| 4,544,466 | 10/1985 | Lindstrom | 204/159.11 |
| 4,549,945 | 10/1985 | Lindstrom | 204/159.11 |
| 4,582,861 | 4/1986 | Gella et al. | 521/118 |
| 4,623,676 | 11/1986 | Kistner | 522/15 |
| 4,677,137 | 6/1987 | Bany et al. | 522/31 |
| 4,707,432 | 11/1987 | Gatechair et al. | 430/281 |
| 4,740,577 | 4/1988 | DeVoe et al. | 528/51 |
| 4,751,138 | 6/1988 | Tumey | 428/323 |

FOREIGN PATENT DOCUMENTS

| | | |
|---|---|---|
| 28696 | 5/1981 | European Pat. Off. |
| 94914 | 11/1983 | European Pat. Off. |
| 94915 | 11/1983 | European Pat. Off. |
| 0109851 | 5/1984 | European Pat. Off. |
| 126712 | 11/1984 | European Pat. Off. |
| 152377 | 8/1985 | European Pat. Off. |
| 250634 | 12/1987 | European Pat. Off. |
| 2191199A | 12/1987 | United Kingdom |

OTHER PUBLICATIONS

T. A. Speckhard, K. K. S. Hwang, S. B. Lin, S. Y. Tsay, M. Koshiba, Y. S. Ding, S. L. Cooper, *J. Appl. Polymer Science*, 1985, 30, 647–666.

C. Bleustein, *Polym.-Plast. Technol. Eng.*, 1981, 17 83–93.

G. Smets, *Pure G. Appl. Chem.*, 53, 611, 615 (1981).

H. M. Wagner, M. D. Purbrick, *J. Photograph Science*, 29, 230–235 (1981).

J. Kosar, Light Sensitive Systems: Chemistry and Application of Nonsilver Halide Photographic Processes, Wiley, New York, 1965, pp. 158–193.

H. J. Timpe and H. Baumann, *Wiss. Z. Tech. Hochsch. Leuna-Merseburg*, 26, 439 (1984).

H. Baumann, B. Strehmel, H. J. Timpe & U. Lammel, *J. Prakt. Chem.*, 326 (3) 415 (1984).

H. Baumann, U. Oertel & H. J. Timpe, *Europ. Polym. J.*, 22(4) 313 (Apr. 3, 1986).

Roesler, *Modern Paint Coatings*, Apr., 1986, pp. 46–55.

Primary Examiner—Marion E. McCamish
Assistant Examiner—Arthur H. Koeckert
Attorney, Agent, or Firm—Donald M. Sell; Walter N. Kirn; Lorraine R. Sherman

[57] ABSTRACT

A polymerizable composition comprises a polymeric precursor selected from the group consisting of (1) at least one ethylenically-unsaturated monomer, optionally in combination with an epoxy monomer or polyurethane precursors, or (2) at least one epoxy monomer, or (3) polyurethane precursors, and a curing agent comprising an organometallic salt and an onium salt.

42 Claims, No Drawings

ENERGY CURABLE COMPOSITIONS: TWO COMPONENT CURING AGENTS

FIELD OF THE INVENTION

This invention relates to an energy-polymerizable composition comprising an ethylenically-unsaturated monomer optionally in combination with polyurethane precursors or an epoxy monomer, or an epoxy monomer, or polyurethane precursors, and as curing agent a combination of an organometallic salt and an onium salt and a method therefor. In another aspect, cured articles comprising the compositions of the invention are disclosed. The compositions are useful, for example, as protective coatings, binders for magnetic media or abrasives, adhesives, and in graphic arts applications.

BACKGROUND OF THE INVENTION

Various polymeric coatings and articles are produced in processes involving the use of organic solvents. There is an intense effort by law makers, researchers, and industry to promote high and 100% solids formulations to reduce or eliminate the use of such solvents and the attendent costs and environmental contamination. These processes require a latent catalyst or latent reaction promoter which can be activated in a controlled fashion.

Thermal curing of polyurethane precursors using reaction promotors such as tin salts and tertiary amines is known in the art. Curing of polymerizable mixtures of polyisocyanates with polyols (referred to as polyurethane precursors) using thermally latent catalysts is known in the art (see for example U.S. Pat. Nos. 4,521,545, and 4,582,861).

Photocuring of urethane (meth)acrylates is well known (see T. A. Speckhard, K. K. S. Hwang, S. B. Lin, S. Y. Tsay, M. Koshiba, Y. S. Ding, S. L. Cooper *J. Appl. Polymer Science*, 1985, 30, 647–666. C. Bluestein Polym.-Plast. Technol. Eng. 1981, 17 83–93). Photocuring of polyurethane precursors using diazonium salts, tertiary amine precursors, and organotin compounds is also known (see U.S. Pat. Nos. 4,544,466, 4,549,945, and EP No. 28,696, Derwent abstract). All of these methods suffer from one or more of the following disadvantages: sensitivity to oxygen, requirement of ultraviolet and/or high intensity light, the need for modified resins, loss or dilution of urethane properties, low activity, poor solubility, and poor potlife.

The prior art discloses processes for the polymerization of epoxy materials. It is further known that a metallocene, such as ferrocene, can be used as a curing accelerator for epoxy materials (U.S. Pat. No. 3,705,129). U.S. Pat. Nos. 3,709,861, 3,714,006, 3,867,354 and 4,237,242 relate to the use of transition metal complexes in the reaction between polyepoxides and polyfunctional curing additives, but they do not teach the polymerization of epoxide group-containing compositions not containing a curing additive. The polymerization of epoxide group-containing materials is also known. Among such processes are those in which the polymerization catalyst is a radiation-sensitive onium salt of a Lewis acid (e.g. diazonium salts as is described in U.S. Pat. Nos. 3,794,576 and 4,080,274; halonium salts as is disclosed in U.S. Pat. No. 4,026,705; and the onium salts of Group VIA elements, particularly the sulfonium salts, as are disclosed in U.S. Pat. No. 4,058,400), or a dicarbonyl chelate compound of a Group IIIA-VA element as is disclosed in U.S. Pat. No. 4,086,091. These compositions are limited to ultraviolet radiation for polymerization. Furthermore, the dicarbonyl chelates are moisture sensitive.

U.S. Pat. No. 4,216,288 teaches the thermal curing of cationically polymerizable compositions using onium salts and reducing agents.

Energy polymerizable compositions comprising ionic salts of organometallic complex cations and cationically sensitive materials and the curing thereof has been taught (see European Patent Document Nos. 109,851; 094,914, Derwent abstract; and 094,915, Derwent abstract).

Neutral organometallic compounds have been used in combination with neutral halogenated compounds for the photocuring of ethylenically-unsaturated monomers. (G. Smets, *Pure G. Appl. Chem.*, 53, 611,615 (1981); H. M. Wagner, M. D. Purbrick, *J. Photograph Science*, 29, 230–235 (1981).

The use of certain photosensitizers with onium salts for initiation of polymerization of ethylenically-unsaturated monomers is also well known in the art. This technique has found applications in printing, duplication, copying, and other imaging systems (see J. Kosar in Light Sensitive Systems: Chemistry and Application of Nonsilver Halide Photographic Processes, Wiley, New York, 1965, pp 158–193). Aryliodonium salts have been previously described for use as photoinitiators in addition-polymerizable compositions. (See U.S. Pat. Nos. 3,729,313, 3,741,769, 3,808,006, 4,228,232, 4,250,053 and 4,428,807; H. J. Timpe and H. Baumann, *Wiss Z. Tech. Hochsch. Leuna-Merseburg*, 26, 439 (1984); H. Baumann, B. Strehmel, H. J. Timpe and U. Lammel, *J. Prakt. Chem.*, 326 (3), 415 (1984); and H. Baumann, U. Oertel and H. J. Timpe, *Euro. Polym. J.*, 22 (4), 313 (Apr. 3, 1986).

Radiation dual curable compositions containing ethylenically unsaturated monomers and epoxy monomers have been described in U.S. Pat. Nos. 4,156,035, 4,227,978, and 4,623,676. These compositions include onium salts combined with organic compounds as the curing agent, but do not contain any organometallic compounds.

The dual curing of acrylate/polyurethane precursor mixtures is known but these curing methods are not entirely photoactivated nor are any methods known that provide for the simultaneous curing of the polyurethane precursors and acrylates (see U.S. Pat. No. 4,432,793 and Roesler, *Modern Paint and Coatings*, Apr., 1986, pages 46–55).

U.S. Pat. No. 4,677,137 teaches the use of one of a supported onium salt or an ionic salt of organometallic complex as an initiator of the polymerization of cationically polymerizable materials. The reference does not teach the combination of an ionic salt of an organometallic complex and an onium salt as photoinitiators.

U.S. Pat. No. 4,740,577 and EPO No. 0 250 364 teach the use of an ionic salt of an organometallic complex combined with polyurethane precursors in an energy polymerizable composition. The references do not disclose the use of an onium salt with the ionic salt of an organometallic complex for curing polyurethane precursors.

U.S. Pat. No. 4,707,432 teaches a free radically polymerizable composition comprising a free radically polymerizable material and a photoinitiator system comprising an alpha-cleavage or homolytic bond cleavage photoinitiator and a ferrocenium salt. The reference does not teach the combination of an onium salt with the ionic salt of an organometallic complex. They teach specifically that the free radical initiator is not an onium compound.

EP Nos. 126712 and 152377 (Derwent Abstracts) disclose hardenable composition contain a radical and/or cationically polymerizable material, or their mixtures and at least one ferrous-aromatic complex compound and at least one electron-acceptor as oxidising agent. Onium salts are not disclosed.

GB No. 2191199A, published Dec. 9, 1987, teaches the combination of an onium salt with the ionic salt of an organometallic complex for polymerization of compositions by irradiating at two different wavelengths. The reference does not teach the simultaneous initiation of the polymerization of two different polymerizable materials nor do they demonstrate the enhanced thermal stability derived from this composition. The reference does not teach the polymerization of polyurethane precursors, nor does it teach that such compositions cure faster and have increased stability.

SUMMARY OF THE INVENTION

Briefly, the present invention provides an energy polymerizable composition comprising one of (1) at least one ethylenically-unsaturated monomer, and, optionally, one of polyurethane precursors or epoxy monomers, or (2) at least one epoxy monomer, or (3) polyurethane precursors, and as curing agent a combination of a organometallic salt (ionic salt of an organometallic complex cation) and an onium salt. The compositions are useful as protective and decorative coatings, inks, adhesives, in restorative and sealant applications, and in imaging applications.

When two polymerizable components are present they can be present in any proportion, preferably in the range of 0.1:99.9 to 99.9:0.1 part by weight, more preferably 1:99 to 99:1 part by weight, and most preferably 2:98 to 98:2 parts by weight.

What is not taught in the prior art, but what is taught in this invention, is the use of organometallic salts in combination with onium salts for the simultaneous photo- or accelerated particle-induced (electron beam-induced) or thermal curing of ethylenically-unsaturated monomers alone or in combination with polyurethane precursors or epoxy monomers, or epoxy monomers, or polyurethane precursors. When two different polymerizable materials are present, the instant invention composition and method relies on the simultaneous initiation of the polymerization of both materials. Only one irradiation step is utilized.

Advantages of compositions of the present invention when utilized in 100% reactive coating compositions include:

An industrial process innovation is disclosed that will reduce, minimize, or eliminate the generation of industrial solvent waste while reducing energy consumption.

Radiation processing, particularly utilizing electron beam and photogenerated catalysts, has potential capability for penetrating and polymerizing thick and pigmented coatings.

More readily available monomers can be used in place of functionalized oligomers (used in the prior art) thereby resulting in lower viscosity monomer solutions which are easier to coat than more viscous oligomer solutions.

Expanding the scope of curable monomers to include polyisocyanates/polyols and epoxides allows increased flexibility in designing coatings with specific properties.

The combination photoinitiators provides increased thermal stability in combination with increased rate of cure.

In this application:

"energy-induced curing" means curing by means of at least one of electromagnetic radiation (ultraviolet and visible) accelerated particles (including electron beam), and thermal (infrared and heat) means;

"ethylenically-unsaturated monomer" means those monomers that polymerize by a free-radical mechanism;

"catalytically-effective amount" means a quantity sufficient to effect polymerization of the curable composition to a polymerized product at least to a degree to cause an increase in the viscosity of the composition;

"organometallic salt" means one or more ionic salts of organometallic complex cations wherein the cations contain at least one carbon atom of an organic group bonded to a metal atom ("Basic Inorganic Chemistry", F. A. Cotton, G. Wilkinson, Wiley, New York, 1976, p. 497);

"polyurethane precursors" means a mixture of one or more monomers of the type including diisocyanates and polyisocyanates, and one or more monomers of the type including diols and polyols. Compounds bearing at least two isocyanate-reactive hydrogen atoms may be substituted for diols and polyols; the ratio of isocyanate groups to isocyanate-reactive hydrogen atoms is 1:2 to 2:1;

"bridging ligand" means a ligand that bonds to two or more metals in the presence or absence of metal-metal bonds;

"polyisocyanate" means an aliphatic or aromatic isocyanate having 2 or more isocyanate groups;

"polyol" means an aliphatic or aromatic compound containing 2 or more hydroxyl groups;

"onium salt" means one or more salts of cationic compounds such as diazonium, halonium, and hypervalent Group VIA elements; and "bireactive monomer" means a monomer which contains an ethylenically unsaturated group and at least one of an epoxy, an isocyanate, and an isocyanate-reactive group.

An energy polymerizable mixture comprising an ethylenically-unsaturated monomer and optionally either polyurethane precursors or epoxy compounds, and as curing agent, only an organometallic salt is disclosed in assignee's copending patent application U.S. Ser. No. 07/201,058, filed the same date as this application.

DETAILED DISCLOSURE OF THE INVENTION

The present invention provides a photo and/or thermally polymerizable composition comprising one of (1) at least one ethylenically-unsaturated monomer optionally in combination with at least one of polyurethane precursors or at least one epoxy monomer, or (2) at least one epoxy monomer, or (3) polyurethane precursors, and a bicomponent curing agent therefore, the bicomponent curing agent in all cases comprising (1) an organometallic salt having the structure $$[(L^1)(L^2)M]_b(L^3)(L^4)]^{+e} X_f \qquad \text{I}$$

wherein

M represents a metal atom selected from the elements of Periodic Groups IVB, VB, VIB, VIIB, and VIIIB; with the proviso that formula I represents an organometallic salt having a mono- or bimetallic cation;

$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none, or 1 to 6 ligands contributing an even number of sigma-electrons that can be the same or different selected from mono-, di-, and tri-dentate ligands, each donating 2, 4, or 6 sigma-electrons to the valence shell of M;

$L^3$ represents none, 1 or 2 bridging ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents none, 1, 2, or 3 bridging ligands contributing an even number of sigma-electrons that can be the same or different selected from mono-, di-, and tri-dentate ligands, each donating 2, 4 or 6 sigma-electrons to the valence shells of two metal atoms M, simultaneously; with the proviso that the total electronic charge contributed to M by the ligands $L^1$, $L^2$, $L^3$, and $L^4$ plus the product of the ionic charge on M with b results in a residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer of 1 or 2, the number of anions required to neutralize the positive charge e on the cation; and (2) an onium salt oxidizing agent having the structure:

AY          III wherein

A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, all incorporated herein by reference, preferably selected from diazonium, iodonium, and sulfonium cations, more preferably A is selected from diphenyliodonium, triphenylsulfonium and phenylthiophenyl diphenylsulfonium; and Y is an anion, the counterion of the onium salts including those in which Y is an organic sulfonate, or halogenated metal or metalloid, such as $CH_3SO_3^-$, $CF_3SO_3^-$, $C_6H_5SO_3^-$, p-toluenesulfonate, p-chlorobenzenesulfonate and related isomers and the like, and those in which Y has the formula $DZ_r$, wherein D is a metal from Groups IB to VIIIB or a metal or metalloid from Groups IIIA to VA of the Periodic Chart of Elements, Z is a halogen atom or hydroxy group, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorous. Preferably, the halogen, Z, is chlorine or fluorine. Illustrative of suitable anions are $BF_4^-$, $PF_6^-$, $AsF_6^-$, $SbF_4^-$, $FeCl_4^-$, $SnCl_5^-$, $SbF_5^-$, $AlF_6^-$, $GaCl_4^-$, $InF_4^-$, $TiF_6^-$, etc. Preferably, the anions are $CF_3SO_3^-$, $BF_6^-$, $PF_6^-$, $SbF_6^-$, $SbF_5OH^-$, $AsF_6^-$, and $SbCl_6^-$.

In a preferred composition of the invention, the salts of the organometallic complex cation have the formula:

$$[(L^5)(L^6)M]^{+e} X_f \qquad \text{II}$$

wherein

M represents a metal atom selected from elements of the Period Groups IVB, VB, VIB, VIIB, and VIIIB;

$L^5$ represents none, one or two ligands that can be the same or different, contributing pi-electrons selected from the same groups of ligands from which ligand $L^1$ of formula I is selected;

$L^6$ represents none or 1 to 6 ligands that can be the same or different, contributing an even number of sigma-electrons selected from the same group of ligands from which ligand $L^2$ of formula I is selected; with the proviso that the total electronic charge contributed to M by $L^5$ and $L^6$ plus the ionic charge on M results in a residual net positive charge of e to the complex; and e, f, and X have the same definition as given in formula I.

Salts of organometallic complex cations having formulae I and II are radiation sensitive in addition to being thermally sensitive or they can be cured in a two stage curing process using radiation followed by heat.

Ligands $L^1$ to $L^6$ are well known in the art of transition metal organometallic compounds.

Ligand $L^1$ of general formula I and ligand $L^5$ of general formula II are provided by any monomeric or polymeric compound having an accessible unsaturated group, i e., an ethylenic,

group; acetylenic, —C≡C— group; or aromatic group which have accessible pi-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkane, e.g., decalin; an aromatic hydrocarbon, e.g., anisole; an ether, e.g., tetrahydrofuran; etc, or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligands $L^1$ and $L^5$ are the linear and cyclic olefinic and acetylenic compounds having less than 100 carbon atoms, preferably having less than 60 carbon atoms, and from zero to 10 hetero atoms selected from nitrogen, sulfur, non-peroxidic oxygen, arsenic, phosphorus, selenium, boron, antimony, tellurium, silicon, germanium, and tin, such as, for example, ethylene, acetylene, propylene, methylacetylene, 1- butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $eta^3$-allyl, $eta^3$-pentenyl, norbornadiene, $eta^5$-cyclohexadienyl, $eta^6$-cycloheptatriene, $eta^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, $eta^5$-cyclopentadienyl, $eta^6$-benzene, $eta^6$-mesitylene, $eta^6$-hexamethylbenzene, $eta^6$-fluorene, $eta^6$-naphthalene, $eta^6$-anthracene, $eta^6$-chrysene, $eta^6$-pyrene, $eta^7$-cycloheptatrienyl, $eta^6$-triphenylmethane, $eta^{12}$-paracyclophane, $eta^{12}$-1,4-diphenylbutane, $eta^5$-pyrrole, $eta^5$-thiophene, $eta^5$-furan, $eta^6$-pyridine, $eta^6$-gammapicoline, $eta^6$-quinaldine, $eta^6$-benzopyran, $eta^6$-thiochrome, $eta^6$-benzoxazine, $eta^6$-indole, $eta^6$-acridine, $eta^6$-carbazole, $eta^6$-triphenylene, $eta^6$-silabenzene, $eta^6$-arsabenzene, $eta^6$-stibabenzene, $eta^6$-2,4,6-triphenylphosphabenzene, $eta^5$-selenophene, $eta^6$-dibenzostannepine, $eta^5$-tellurophene, $eta^6$-phenothiarsine, $eta^6$-selenanthrene, $eta^6$-phenoxaphosphine, $eta^6$-phenarsazine, $eta^6$-phenatellurazine, and $eta^6$-1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of the ligands $L^1$ and $L^5$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso, oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^2$ in formula I, and $L^6$ in formula II are provided by monodentate and polydentate compounds preferably containing up to about 30 carbon atoms and up to 10 hetero atoms selected from nitrogen, sulfur, non-peroxidic oxygen, phosphorus, arsenic, selenium, antimony, and tellurium, upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., $NO^+$); compounds of Group VA elements such as ammonia, phosphine, trimethylamine, trimethylphosphine, triphenylamine, triphenylphosphine, triphenylarsine, triphenylstibine, tributylphosphite, isonitriles such as phenylisonitrile, butylisonitrile; carbene groups such as ethoxymethylcarbene, dithiomethoxycarbene; alkylidenes such as methylidene, ethylidene; suitable polydentate compounds or groups include 1,2-bis(diphenylphosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolyborate; the hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

Ligand $L^3$ in Formula I is provided by any monomeric or polymeric compound having an accessible unsaturated group, such as an ethylenic group or acetylenic —C≡C— group or an aromatic group which have accessible pi-electrons regardless of the total molecular weight of the compound.

Illustrative of ligand $L^3$ are the linear and cyclic diene and acetylenic compounds preferably having less than 60 carbon atoms and up to 10 hetero atoms selected from nitrogen, sulfur, non-peroxidic oxygen, phosphorus, arsenic, selenium, boron, antimony, tellurium, silicon, germanium, and tin, such as for example, acetylene, methylacetylene, diacetylene, butadiene, 1,2-dimethylacetylene, 1,3-cyclohexadiene, cyclopentadiene, and 1,4-cyclohexadiene; $eta^3$-allyl, $eta^3$-pentenyl, norbornadiene, $eta^5$-cyclohexadienyl, $eta^6$-cycloheptatriene, $eta^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, $eta^5$-cyclopentadienyl, $eta^6$-benzene, $eta^6$-mesitylene, $eta^6$-hexamethylbenzene, $eta^6$-fluorene, $eta^6$-naphthalene, $eta^6$-anthracene, $eta^6$-chrysene, $eta^6$-pyrene, $eta^7$-cycloheptatrienyl, $eta^6$-triphenylmethane, $eta^5$-pyrrole, $eta^5$-thiophene, $eta^5$-furan, $eta^6$-pyridine, $eta^6$-gamma-picoline, $eta^6$-quinaldine, $eta^6$-benzopyran, $eta^6$-thiochrome, $eta^6$-benzoxazine, $eta^6$-indole, $eta^6$-acridine, $eta^6$-carbazole, $eta^6(1,2,3,4,4a,12a)$-$eta^6$-$(7,8,9,10,10a,10b)$chrysene, $eta^6$-triphenylene, $eta^6,eta^{6'}$-paracyclophane, $eta^6,eta^{6'}$-1,4-diphenylbutane, $eta^6$-silabenzene, $eta^6$-arsabenzene, $eta^6$-stibabenzene, $eta^6$-2,4,6-triphenylphosphabenzene, $eta^5$-selenophene, $eta^5$-dibenzostannepine, $eta^5$-tellurophene, $eta^6$-phenothiarsine, $eta^6$-selenanthrene, $eta^6$-phenoxaphosphine, $eta^6$-phenarsazine, $eta^6$-phenatellurazine, and $eta^6$-1-phenylborabenzene. Other suitable aromatic compounds can be found by consulting any of many chemical handbooks.

Each of the ligands $L^3$ can be substituted by groups that do not interfere with the complexing of the ligand with the metal atom or which do not reduce the solubility of the ligand to the extent that complexing with the metal atom does not take place. Examples of substituting groups, all of which preferably have less than 30 carbon atoms and zero to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto (thiomethoxy), phenylmercapto (thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, benzoxy, and cyclohexanecarbonyloxy; hydrocarbylcarbonamido, e.g., acetamido, benzamido; azo; boryl; halo, e.g., chloro, iodo, bromo, and fluoro, hydroxy; cyano; nitro; nitroso, oxo; dimethylamino, diphenylphosphino, diphenylstibine; trimethylgermane; tributyltin; methylseleno; ethyltelluro; and trimethylsiloxy; condensed rings such as benzo, cyclopenta; naphtho, indeno; and the like.

Ligand $L^4$ is provided by monodentate and polydentate compounds preferably containing up to about 30 carbon atoms and zero to 10 hetero atoms selected from nitrogen, sulfur, non-peroxidic oxygen, phosphorus, arsenic, selenium, antimony, and tellurium. Examples of suitable mondentate compounds or groups are carbon monoxide, carbon sulfide, carbon selenide, carbon telluride, alcohols such as ethanol, butanol, and phenol; nitrosonium (i.e., $NO^+$); compounds of Group VA elements such as triphenylamine, triphenylphosphine, triphenylarsine, triphenylstibine, isonitriles such as phenylisonitrile; suitable polydentate compounds or groups include 1,2-bis(diphenylphosphino)-ethane, 1,2-bis(diphenylarsino)ethane, bis(diphenylphosphino)methane, ethylenediamine, propylenediamine, diethylenetriamine, 1,3-diisocyanopropane, and hydridotripyrazolylborate; the hydroxycarboxylic acids such as glycolic acid, lactic acid, salicyclic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as bis(perfluoromethyl)-1,2-dithiolene; aminocarboxylic acids such as alanine, glycine and o-aminobenzoic acid; dicarboxylic diamides such as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc.

M can be any element from the Periodic Groups IVB, VB, VIB, VIIB, and VIIIB, such as, for example, Ti, Zr, Hf, V, Nb, Ta, Cr, Mo, W, Mn, Tc, Re, Fe, Ru, Os, Co, Rh, Ir, Ni, Pd and Pt.

Suitable anions, X, in formulas I and II, of use as the counterion in the ionic salts of the organometallic complex cation in the preferred radiation-sensitive compositions of the invention are those in which X has the formula $DZ_r$, wherein D is a metal from Groups IB to VIIIB or a metal or metalloid from Groups IIIA to VA of the Periodic Chart of Elements, Z is a halogen atom or a hydroxy group, and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Z, of formula II, is chlorine or fluorine. Illustrative of suitable anions are $BF_4^-$, $PF_6^-$, $AsF_6^-$, $SbF_6^-$, $FeCl_4^-$, $SnCl_5^-$, $SbF_5^-$, $AlF_6^-$, $GaCl_4^-$, $InF_4^-$, $TiF_6^-$, $ZrF_6^-$, etc. Preferably, the anions are $BF_4^-$, $PF_6^-$, $SbF_6^-$, $SbF_5OH^-$, $AsF_6^-$, and $SbCl_6^-$.

Additional suitable anions, X, in formulae I and II, of use as the counterion in the ionic salts of the organometallic complex cations include those in which X is an organic sulfonate. Illustrative of suitable sulfonate-containing anions are $CH_3SO_3^-$, $CF_3SO_3^-$, $C_6H_5SO_3^-$, p-toluenesulfonate, p-chlorobenzenesulfonate and related isomers and the like.

There are restrictions on the sum of electrons donated by the ligands, $L^1$, $L^2$, $L^3$, and $L^4$, of formula I and $L^5$ and $L^6$ of formula II, and the valence electrons possessed by the metal. For most complex compounds not involving intramolecular metal-metal bonding, this sum is governed by the "eighteen electron rule"[see J. Chem. Ed., 46, 811 (1969)]. This rule is sometimes called the "nine orbital rule", "the effective number rule", or the "rare gas rule". This rule states that the most stable organometallic compounds tend to be those compounds in which the sum of the electrons donated by the ligands and the metal is eighteen. Those skilled in the art, however, know that there are exceptions to this rule and that organometallic complex compounds having a sum of 16, 17, 19, and 20 electrons are also known. Some of these complexes are transient. Therefore, ionic salts of organometallic complex cations not including intramolecular metal-metal bonding, described by formulas I and II in which the complexed metal has a sum of 16, 17, 18, 19, or 20 electrons in the valence shell and a residual net positive charge of 1 or 2, are included within the scope of the invention.

For complex compounds described in formula I in which intramolecular metal-metal bonding exists serious departure from the "eighteen electron rule" can occur. It has been proposed [J. Amer. Chem. Soc. 100, 5305 (1978)] that the departure from the "eighteen electron rule" in these transition metal complexes is due to the metal-metal interactions destabilizing the metal p orbitals to an extent to cause them to be unavailable for ligand bonding. Hence, rather than count electrons around each metal separately in a metal cluster, cluster valence electrons (CVE) are counted. A binuclear complex, MM, is seen to have 34 CVEs. Therefore, ionic salts of binuclear organometallic complex cations are described by formula I in which the complexed metal cluster, MM, has a sum of 34 CVEs in the valence shell and a residual net positive charge of 1 or 2 are included within the scope of this invention.

Suitable two-component curing agents which include organometallic complex ionic salts described by formulae I or II and onium salts described by formula III of use in the compositions of the invention are those combinations of salts that upon application of sufficient energy, thermal, accelerated particle (electron beam), or electromagnetic radiation having a wavelength from about 200 to 800 nm, will generate an active species capable of catalyzing the polymerization of the compositions of the invention. The level of catalytic activity will, of course, depend on the choice of metal, ligands, and counterions in the organometallic salt and the particular onium salt.

Examples of suitable salts of organometallic complex cations useful in the composition of the invention include the following (proposed structures of typical compounds are shown at the end of the list):

(eta$^5$-cyclopentadienyl)tricarbonyliron(1+) hexafluorophosphate[a]
(eta$^5$-cyclopentadienyl)dicarbonylthiocarbonyliron(1+) tetrafluoroborate
(eta$^5$-cyclopentadienyl)carbonylbis(triphenylstibine)iron(1+) hexafluorophosphate
(eta$^5$-cyclopentadienyl)tricarbonylruthenium(1+) tetrachloroferrate
(eta$^5$-cyclopentadienyl)dicarbonyltriphenylstibineiron(1+) hexafluoroantimonate
(eta$^5$-methylcyclopentadienyl)dicarbonylnitrosyl-manganese(1+) hexafluoroantimonate[b]
(eta$^5$-methylcyclopentadienyl)(eta$^3$-allyl)dicarbonylmanganese(1+) tetrafluoroborate[c]
(eta$^5$-cyclopentadienyl)tetracarbonylmolybdenum(1+) hexafluorophosphate
(eta$^5$-pentadienyl)tricarbonyliron(1+) tetrafluoroborate
(eta$^5$-cyclohexadienyl)tricarbonyliron(1+) hexafluoroarsenate[d]
(eta$^5$-cyclohexadienyl)(ethylidene)carbonyltriphenylphosphineiron(1+) tetrafluoroborate
(eta$^5$-cyclopentadienyl)(ethoxymethylcarbene)carbonyl-triphenylphosphineiron(1+) tetrafluoroborate
(eta$^5$-cyclopentadienyl)(dithiomethoxycarbene)dicarbonyliron-1+) hexafluorophosphate
(eta$^5$-cyclopentadienyl)dicarbonylmethylisonitrileiron(1+) hexafluoroarsenate
(eta$^6$-toluene)tricarbonylmanganese(1+) hexafluoroantimonate[e]
(eta$^6$-mesitylene)tricarbonylrhenium(1+) hexafluoroantimonate
(eta$^7$-cycloheptatrienyl)tricarbonylchromium(1+) hexafluorophosphate
(eta$^7$-cycloheptatrienyl)tricarbonyltungsten(1+) hexafluoroarsenate[f]
(eta$^5$-cyclopentadienyl)(eta$^2$-1-pentene)dicarbonyliron(1+) tetrafluoroborate
(eta$^6$-benzene)(eta$^5$-cyclopentadienyl)iron(1+) hexafluorophosphate
(eta$^6$-mesitylene)(eta$^5$-cyclopentadienyl)iron(1+) tetrafluoroborate
(eta$^6$-naphthalene)(eta$^5$-cyclopentadienyl)iron(1+) hexafluoroantimonate
(eta$^6$-acetophenone)(eta$^5$-methylcyclopentadienyl)iron(1+) hexafluoroarsenate
bis(eta$^5$-cyclopentadienyl)cobalt(1+) hexafluorophosphate
bis(eta$^5$-cyclopentadienyl)iron(1+) hexafluoroantimonate
bis(eta$^5$-chlorocyclopentadienyl)nickel(1+) hexafluorophosphate
bis(eta$^6$-benzene)chromium(1+) hexafluoroantimonate[g]
bis(eta$^6$-hexamethylbenzene)cobalt(2+) hexafluoroarsenate
bis(eta$^6$-hexamethylbenzene)nickel(2+) hexafluoroantimonate
tetracarbonyltriphenylphosphinecobalt(1+) hexafluorophosphate
tricarbonylbis(triphenylphosphine)iridium(1+) hexafluorophosphate
(eta$^3$-allyl)pentacarbonylchromium(1+) tetrafluoroborate
pentacarbonylnitrosylmolybdenum(1+) hexafluorophosphate
(eta$^3$-allyl)tetracarbonyliron(1+) hexafluoroantimonate
hexacarbonylrhenium(1+) hexafluoroantimonate
bis(eta$^6$-mesitylene)iron(2+) hexafluoroantimonate[h]
bis(eta$^6$-hexamethylbenzene)manganese(1+) tetrafluoroborate
bis(eta$^6$-mesitylene)vanadium(1+) hexafluorophosphate
(eta$^7$-cycloheptatrienyl)(eta$^5$-cyclopentadienyl)manganese(1+) hexafluoroarsenate
(eta$^8$-cyclooctatetraenyl)(eta$^5$-cyclopentadienyl)chromium(1+) hexafluorophosphate
(eta$^6$-fluorene)(eta$^5$-cyclopentadienyl)iron(1+) hexafluorophosphate[i]
(eta$^6$-1-phenylborabenzene)(eta$^5$-cyclopentadienyl)cobalt(1+) hexafluorophosphate
(eta$^5$-cyclopentadienyl)(eta$^5$-N-methylpyrrolyl)iron(1+) hexafluorophosphate
(eta$^6$-2,3,4,5-tetrathiomethoxybenzene)(eta$^5$-cyclopentadienyl)iron(1+) hexafluoroarsenate
[(eta$^6$-1,2,3,4,5,6)(eta$^6$-7,8,9,10,11,12)biphenyl]-bis(eta$^5$-cyclopentadienyl)diiron(2+) tetrafluoroborate
[(eta$^6$-1,2,3,4,4a,9a)(eta$^6$-5,6,7,8,8a,5a)fluorene]-bis(eta$^5$-cyclopentadienyl)diiron(2+) hexafluorophosphate
[(eta$^6$-1,2,3,4,4a,12a)(eta$^6$-7,8,9,10,10a,6a)chrysene]-bis-(eta$^6$-benzene)dichromium(2+) hexafluoroantimonate
dicarbonyl[bis(diphenylphosphino)ethane]bis(eta$^5$-cyclopentadienyl)diiron(1+) hexafluorophosphate
[(eta$^6$-4,5,5a,28c,28b,3a)(eta$^6$-8a,8b,20d,22a,22b,24c) 1H,14H-dipyrano(3,4,5-gh: 3',4',5'-g'h')anthra(2",1",9": 4,5,6;6",5",10": 4',5',6')diisoquino(2,1-a:2',1'-a$^1$)diperimidine]bis(eta$^5$-cyclopentadienyl)-diiron(2+) hexafluoroantimonate
[(eta$^6$-1,2,3,3a,13b,13a)benzo(10,11)chryseno(2,3-d)(1,3)dioxole](eta$^5$-methylcyclopentadienyl)iron(1+) hexafluorophosphate
[(eta$^6$-1,2,3,3a,16c,16b)-(eta$^6$-9,10,11,11a,13c,8b)cycloocta(1,2,3,4-def:5,6,7,8d'e'f')diphenanthrene]bis-(eta$^5$-acetylcyclopentadienyl)diiron(2+) tetrafluoroborate
bis(eta$^5$-acetylcyclopentadienyl)iron(1+) tetrafluoroborate (eta³-1-methylallyl)tetracarbonyliron(+1) hexafluorophosphate (eta³-1,3-dimethylallyl)tetracarbonyliron(+1) hexachloroantimonate

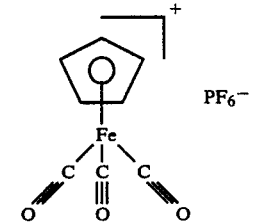 (a)

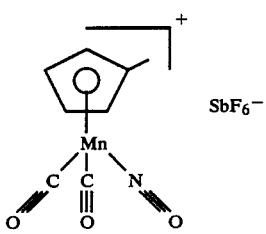 (b)

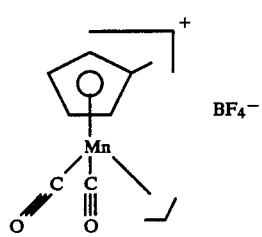 (c)

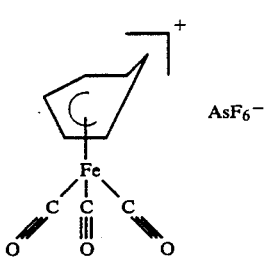 (d)

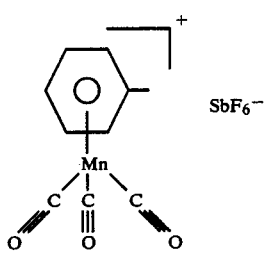 (e)

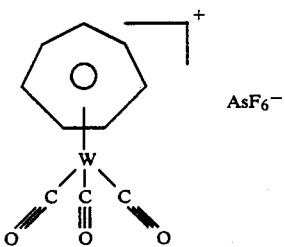 (f)

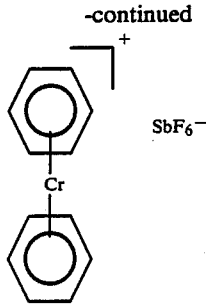 (g)

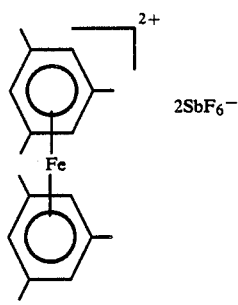 (h)

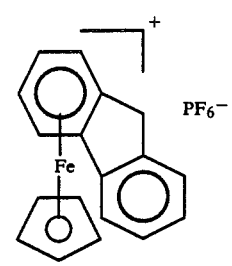 (i)

Organometallic salts are known in the art and can be prepared as disclosed in, for example, EPO Nos. 109,851, 094,914, 094,915 and 126,712, which are incorporated herein by reference. In addition to the compounds of formulae I and II, all of the organometallic salts disclosed in these references are useful in the present invention.

The bicomponent curing agent can be present in an effective amount which is generally in the range of 0.01 to 20, preferably 0.1 to 10 weight percent of the total composition. The ratio of organometallic salt to onium salt is in the range of 10:1 to 1:10 by weight, preferably 5:1 to 1:5 by weight.

The present invention also provides a process for the polymerization of one of ethylenically-unsaturated monomers optionally in combination with polyurethane precursors or epoxy monomers, or epoxy monomers only, or polyurethane precursors only, comprising the steps of:

(a) providing said at least one ethylenically-unsaturated monomers optionally in combination with polyurethane precursors or epoxy monomers, or at least one epoxy compound, or polyurethane precursors, (b) adding to said compound or compounds a combination of a catalytically effective amount of a curing agent comprising an organometallic salt and an onium salt (and all permutations of the order of mixing the aforementioned components), thereby forming a polymerizable mixture, and (c) allowing the mixture to polymerize or adding energy to the mixture to affect polymerization.

In a further aspect, there is also provided a method for preparing coated articles containing the cured composition of the invention comprising the steps of:
(a) providing a substrate,
(b) coating an energy polymerizable mixture as described above onto at least one surface of said substrate by methods known in the art, such as bar, knife, reverse roll, knurled roll, curtain, or spin coatings, or by dipping, spraying, brushing, and the like, with or without a coating solvent, and
(c) applying energy (after evaportion of solvent if present and if desired) to the article to cause the polymerization of the coating.

In a still further aspect, there are also provided shaped articles comprising the polymerizable mixture of the invention. The articles can be provided, for example, by techniques such as molding, injection molding, casting, and extrusion. Applying energy to the mixture causes polymerization and provides the cured shaped article.

It may be desirable to add solvent to solubilize components and aid in processing. Solvent, preferably organic solvent, in an amount up to 99 weight percent, but preferably in the range of 0 to 90 weight percent, most preferably in the range of 0 to 75 weight percent, of the polymerizable composition can be used.

A wide variety of monomers can be energy polymerized using the curing agent of the invention. Suitable compounds containing at least one ethylenioally-unsaturated double bond, can be monomers and/or oligomers such as (meth)acrylates, (meth)acrylamides, and vinyl compounds, and are capable of undergoing free radical polymerization. Such monomers include mono-, di-, or polyacrylates and methacrylates such as methyl acrylate, methyl methacrylate, ethyl acrylate, isopropyl methacrylate, isooctyl acrylate, acrylic acid, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethylacrylate, 1,4-cyclohexanediol diacrylate, pentaerythritol triacrylate, pentaerythritol [tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyl-dimethylmethane, tris-hydroxyethylisocyanurate trimethacrylate; the bis-acrylates and bis-methacrylates of polyethylene glycols of molecular weight 200–500, copolymerizable mixtures of acrylated monomers such as those of U.S. Pat. No. 4,652,274, and acrylated oligomers such as those of U.S. Pat. No. 4,642,126; bireactive monomers such as epoxy (meth)acrylates, isocyanato (meth)acrylates, and hydroxy (meth)acrylates, preferred examples including hydroxyethyl (meth)acrylate, hydroxypropyl (meth)acrylate, isocyanatoethyl (meth)acrylate, glycidyl (meth)acrylate, and m-isopropenyl-alpha,alpha-dimethylbenzyl isocyanate; unsaturated amides such as acrylamide, methylene bis-acrylamide, methylene bis-methacrylamide, 1,6-hexamethylene bis-acrylamide, diethylene triamine tris-acrylamide and beta-methacrylaminoethyl methacrylate; and vinyl compounds such as styrene, divinylbenzene diallyl phthalate, divinyl succinate, divinyl adipate, divinyl phthalate, and vinyl azlactones as disclosed in U.S. Pat. No. 4,304,705. Mixtures of two or more monomers can be used if desired. Bireactive monomers are particularly useful to achieve crosslinking of two different polymerizable species.

The polyisocyanate component of the polyurethane precursors that can be cured or polymerized in the bicomponent curing systems of the present invention may be any aliphatic, cycloaliphatic, araliphatic, aromatic, or heterocyclic polyisocyanate, or any combination of such polyisocyanates. Particularly suitable polyisocyanates correspond to the formula $$Q(NCO)_p \qquad \text{IV}$$

in which p is an integer 2 to 4, and Q represents an aliphatic hydrocarbon di-, tri-, or tetra-radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 100 carbon atoms and zero to 50 heteroatoms. The heteroatoms that can be present in Q include non-peroxidic oxygen, sulfur, nonamino nitrogen, halogen, silicon, and non-phosphino phosphorus.

Examples of polyisocyanates are as follows: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (see German Auslegenschrift No. 1,202,785, U.S. Pat. No. 3,401,190), 2,4- and 2,6-hexahydrotolylene diisocyanate and mixtures of these isomers, hexahydro-1,3- and/or -1,4phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and/or -4,4'-diisocyanate, naphthylene-1,5-diisocyanate, and the reaction products of four equivalents of the aforementioned isocyanate-containing compounds with compounds containing two isocyanate-reactive groups.

According to the present invention, it is also possible, for example, to use triphenyl methane-4,4',4''-triisocyanate, polyphenyl polymethylene polyisocyanates described in British Patent Nos. 874,430 and 848,671, m- and p-isocyanatophenyl sulphonyl isocyanates according to U.S. Pat. No. 3,454,606, perchlorinated aryl polyisocyanates of the type described, for example, in German Auslegeschrift No. 1,157,601 (U.S. Pat. No. 3,277,138), polyisocyanates containing carbodiimide groups of the type described in U.S. Pat. No. 3,152,162 and in German Offenlegungsschrift Nos. 2,504,400, 2,537,685 and 2,552,350, norbornane diisocyanates according to U.S. Pat. No. 3,492,330, polyisocyanates containing allophanate groups of the type described, for example, in British Patent No. 994,890, in Belgian Pat. No. 761,626 and in Dutch Patent Application No. 7,102,524, polyisocyanates containing isocyanurate groups of the type described, for example in U.S. Pat. No 3,001,973, in German Patent Nos. 1,022,789, 1,222,067 and 1,027,394 and German Offenlegungsschrift Nos. 1,929,034 and 2,004,048, polyisocyanates containing urethane groups of the type described, for example, in Belgian Patent No. 752,261 or in U.S. Pat. Nos. 3,394,164 and 3,644,457, polyisocyanates containing acrylated urea groups according to German Patent No. 1,230,778, polyisocyanates containing biuret groups of the type described, for example, in U.S. Pat. Nos. 3,124,605, 3,201,372 and 3,124,605 and in British Patent No. 889.050, polyisocyanates produced by telomerization reactions of the type described for example in U.S. Pat. No. 3,654,106, polyisocyanates containing ester groups of the type described, for example, in British Patent Nos. 965,474 and 1,072,956, in U.S. Pat. No. 3,567,763 and in German Patent No. 1,231,688, reaction products of the above-mentioned diisocyanates with acetals according to German Patent 1,072,385 and polyisocyanates containing polymeric fatty acid esters according to U.S. Pat. No. 3,455,883.

It is also possible to use distillation residues having isocyanate groups obtained in the commercial production of isocyanates, optionally in solution in one or more of the above-mentioned polyisocyanates. It is also possible to use any mixtures of the above-mentioned polyisocyanates.

Preferred polyisocyanates are hexamethylene diisocyanate, its isocyanurate and its biuret; 4,4'-methylenebis(cyclohexylisocyanate); 1-isocyanato-3,3,5-trimethyl-5-isocyanatomethyl cyclohexane (isophorone diisocyanate); the tolylene diisocyanates and their isocyanurates; the mixed isocyanurate of tolylene diisocyanate and hexamethylene diisocyanate; the reaction product of 1 mol of trimethylol propane and 3 mols of tolylene diisocyanate and also crude diphenyl methane diisocyanate.

Also useful are blocked polyisocyanates, which are known in the art and are commercially available, wherein the blocking group can be, for example, phenol, epsilon-caprolactam, hydroxamic acid ester, ketoxime, t-butyl acetoacetate, and others described in Z. W. Wicks, Jr., "Progress in Organic Coatings", 9 pp. 3-28 (1981).

Suitable compounds containing at least 2 isocyanate-reactive hydrogen atoms can be high or low molecular weight compounds, having a weight average molecular weight, generally from about 50 to 50,000. In addition to compounds containing amino groups, thiol groups or carboxyl groups, are, preferably, compounds containing hydroxyl groups, particularly compounds containing from about 2 to 50 hydroxyl groups and above all, compounds having a weight average molecular weight of from about 500 to 25000, preferably from about 700 to 2000, for example, polyesters, polyethers, polythioethers, polyacetals, polycarbonates, poly(meth)acrylates, and polyester amides, containing at least 2, enerally from about 2 to 8, but preferably from about 2 to 4 hydroxyl groups, or even hydroxyl-containing prepolymers of these compounds and a less than equivalent quantity of polyisocyanate, of the type known for the production of polyurethanes.

Representatives of the above-mentioned compounds used in accordance with the present invention are described, for example, in High Polymers, Vol. XVI, "Polyurethanes, Chemistry and Technology", By Saunders and Frisch, Interscience Publishers, New York/London, and Vol. I, 1962, pages 32 to 42 and pages 44 to 54 and Vol. II. 1964, pages 5–6 and 198–199, and in "Kunststoff-Handbuch", Vol. VII, Vieweg-Hochtlen, Carl-HanserVerlag, Munich, 1966, for example, on pages 45 to 71. It is, of course, possible to use mixtures of the above-mentioned compounds containing at least two isocyanate-reactive hydrogen atoms and having a molecular weight of from about 50 to 50,000 for example, mixtures of polyethers and polyesters.

In some cases, it is particularly advantageous to combine low-melting and high-melting polyhydroxyl containing compounds with one another (German Offenlegungsschrift No. 2,706,297).

Low molecular weight compounds containing at least two isocyanate-reactive hydrogen atoms (molecular weight from about 50 to 400) suitable for use in accordance with the present invention are compounds preferably containing hydroxyl groups and generally containing from about 2 to 8, preferably from about 2 to 4 isocyanatereactive hydrogen atoms. It is also possible to use mixtures of different compounds containing at least two isocyanate-reactive hydrogen atoms and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher polypropylene glycols, dibutylene glycol, higher polybutylene glycols, 4,4'-dihydroxy diphenyl propane and dihydroxy methyl hydroquinone.

Other polyols suitable for the purposes of the present invention are the mixtures of hydroxy aldehydes and hydroxy ketones ("formose") or the polyhydric alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084, 2,714,084, 2,714,104, 2,721,186, 2,738,154 and 2,738,512). Solutions of polyisocyanate polyaddition products, particularly solutions of polyurethane ureas containing ionic groups and/or solutions of polyhydrazodicarbonamides, in low molecular weight polyhydric alcohols may also be used as the polyol component in accordance with the present invention (German Offenlegungsschrift No. 2,638,759).

Many other compounds containing isocyanatereactive hydrogen atoms and polyisocyanates are useful in the present invention, and are obvious to those skilled in the art of polyurethane science and technology.

Epoxy compounds that can be cured or polymerized by the bicomponent curing agents of this invention, using the latter in a catalytically effective amount, are those known to undergo cationic polymerization and include 1,2-, 1,3-, and 1,4-cyclic ethers (also designated as 1,2-, 1,3-, and 1,4-epoxides). The 1,2-cyclic ethers are preferred.

The cyclic ethers which can be polymerized in accordance with this invention include those described in "Ring-Opening Polymerizations", Vol. 2, by Frisch and Reegan, Marcel Dekker, Inc. (1969). Suitable 1,2-cyclic ethers are the monomeric and polymeric types of epoxides. They can be aliphatic, cycloaliphatic, aromatic, or heterocyclic and will typically have an epoxy equivalency of from 1 to 6, preferably 1 to 3. Particularly useful are the aliphatic, cycloaliphatic, and glycidyl ether type 1,2-epoxides such as propylene oxide, epichlorohydrin, styrene oxide, vinylcyclohexene oxide, cyclohexeneoxide, vinylcyclohexene dioxide, glycidol, butadiene oxide, glycidyl methacrylate, diglycidyl ether of bisphenol A, 3,4-epoxycyclohexylmethyl-3,4- epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, and epoxy silicones, e.g., dimethylsiloxanes having cycloaliphatic epoxide or glycidyl ether groups.

A wide variety of commercial epoxy resins are available and listed in "Handbook of Epoxy Resins" by Lee and Neville, McGraw Hill Book Company, New York (1967) and in "Epoxy Resin Technology" by P. F. Bruins, John Wiley & Sons, New York (1968). Representative of the 1,3- and 1,4-cyclic ethers which can be polymerized in accordance with this invention are oxetane, 3,3-bis(chloromethyl)oxetane, and tetrahydrofuran.

In particular, cyclic ethers which are readily available include propylene oxide, oxetane, epichlorohydrin, tetrahydrofuran, styrene oxide, cyclohexeneoxide, vinylcyclohexene oxide, glycidol, glycidyl methacrylate, octylene oxide, phenyl glycidyl ether, 1,2-butane oxide, diglycidyl ether of bisphenol A (e.g., "Epon 828" and "DER 331"), vinylcyclohexene dioxide (e.g., "ERL-4206"), 3,4-epoxycyclohexylmethyl-3,4-epoxycyclohexanecarboxylate (e.g., "ERL-4221"), 3,4-epoxy-6-methylcyclohexanecarboxylate (e.g., "ERL-4201"), bis(3,4-epoxy-6-methylcyclohexylmethyl)adipate (e.g., "ERL-4289"), aliphatic epoxy modified with polypropylene glycol (e.g., "ERL-4050" and "ERL-4052"), dipentene dioxide (e.g., "ERL-4269"), epoxidized polybutadiene (e.g., "Oxiron 2001"), silicone epoxy (e.g., "Syl-Kem 90"), 1,4-butanediol diglycidyl ether (e.g., Araldite RD-2), polyglycidyl ether of phenolformaldehyde novolak (e.g., "DER-431", "Epi-Rez 521" and "DER-438"), resorcinol diglycidyl ether (e.g., "Kopoxite"), polyglycol diepoxide (e.g., "DER 736"), polyacrylate epoxide (e.g., "Epocryl U-14"), urethane modified epoxide (e.g., "QX3599"), polyfunctional flexible epoxides (e.g., "Flexibilizer 151"), and mixtures thereof as well as mixtures thereof with co-curatives, curing agents, or hardeners which also are well known (see Lee and Neville and Bruins, supra). Representative of the co-curatives or hardeners which can be used are acid anhydrides such as nadic methyl anhydride, cyclopentanetetracarboxylic dianhydride, pyromellitic anhydride, cis-1,2-cyclohexanedicarboxylic anhydride, and mixtures thereof.

Where ethylenically-unsaturated compounds are used in combination with an epoxy monomer or a polyurethane precursor, the polymerizable components can be present in any proportion, preferably 0.1:99.9 to 99.9:0.1, more preferably 1:99 to 99:1, most preferably 2:98 to 98:2 parts by weight.

In general, radiation-induced polymerization of ethylenically-unsaturated monomers, optionally in combination with polyurethane precursors or epoxy monomers, or epoxy monomers, or polyurethane precursors with latent curing agents comprising an organometallic salt and an onium salt can be carried out at room temperature for the majority of energy curable compositions, although low temperature (e.g., $-10°$ C.) or elevated temperature (e.g., 30° to 400° C., preferably 50° to 300° C.) can be used to subdue the exotherm of polymerization or to accelerate the polymerization, respectively. Temperature of polymerization and amount of catalyst will vary and be dependent on the particular curable composition used and the desired application of the polymerized or cured product. The amount of curing agent to be used in this invention should be sufficient to effect polymerization of the monomers or precursors (i.e., a catalytically-effective amount) under the desired use conditions. Such amount generally will be in the range of about 0.01 to 20 weight percent, and preferably 0.1 to 10.0 weight percent, based on the weight of curable composition.

Solvents, preferably organic, can be used to assist in dissolution of the curing agent in the ethylenically-unsaturated monomer, the polyurethane precursors, or the epoxy monomers, and as a processing aid. Representative solvents include acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme) In some applications, it may be advantageous to adsorb the curing agents onto an inert support such as silica, alumina, clays, etc., as described in U.S. Pat. No. 4,677,137.

For those compositions of the invention which are radiation-sensitive, i.e., any source of radiation including accelerated particles (e.g. electron beam radiation) and radiation sources emitting active radiation in the ultraviolet and visible region of the spectrum (e.g., about 200 to 800 nm) oan be used. Suitable sources of radiation include mercury vapor discharge lamps, carbon arcs, tungsten lamps, xenon lamps, lasers, sunlight, etc. The required amount of exposure to effect polymerization is dependent upon such factors as the identity and concentrations of the organometallic salt and onium salt, the particular ethylenically unsaturated monomer, polyurethane precursors, or epoxy monomers, the thickness of the exposed material, type of substrate, intensity of the radiation source and amount of heat associated with the radiation.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. This is particularly advantageous when the latent catalyst does not strongly absorb the incident radiation. Use of a photosensitizer or photoaccelerator increases the radiation sensitivity, allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, Steven L. Murov, Handbook of Photochemistry, Marcel Dekker Inc., N.Y., 27-35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer of photoaccelerator per part of organometallic salt.

Thermal polymerization using direct heating or infrared electromagnetic radiation, as is known in the art, can be used to cure the compositions according to the teachings of this invention.

It is within the scope of this invention to include two-stage polymerization (curing), by first activating the curing agent by irradiating the curable compositions and subsequently thermally curing the activated precursors so obtained, the irradiation temperature being below the temperature employed for the subsequent heat-curing. The activated precursors may normally be cured at temperatures which are substantially lower than those required for the direct thermal curing, with an advantage in some cases in the range from 50° to 110° C. This two-stage curing also makes it possible to control the polymerization in a particularly simple and advantageous manner.

Adjuvants such as solvents, pigments, abrasive granules, stabilizers, light stabilizers, antioxidants, flow agents, bodying agents, flatting agents, colorants, inert fillers, binders, blowing agents, fungicides, bacteriocides, surfactants, plasticizers, and other additives as known to those skilled in the art can be added to the compositions of this invention. These can be added in an amount effective for their intended purpose.

Compositions of this invention are useful for coatings, foams, shaped articles, adhesives, filled or reinforced composites, abrasives, caulking and sealing compounds, casting and molding compounds, potting and encapsulated compounds, impregnating and coating compounds, and other applications which are known to those skilled in the art.

Compositions of this invention may be applied, preferably as a liquid, to a substrate such as steel, aluminum, copper, cadmium, zinc, ceramic, glass, paper, wood, or various plastic films such as poly(ethylene terephthalate), plasticized poly(vinylchloride), poly(propylene), poly(ethylene), and the like, and irradiated. By polymerizing part of the coating, as by irradiation through a mask, those sections which have not been exposed may be washed with a solvent to remove the unpolymerized portions while leaving the photopolymerized, insoluble portions in place. Thus, compositions of this invention may be used in the production of articles useful in the graphic arts suoh as printing plates and printed circuits. Methods of producing printing plates and printed circuits from photopolymerizing compositions are well known in the art (see for example British Patent Specification No. 1,495,746).

Objects and advantages of this invention are further illustrated by the following examples, but the particular materials and amounts thereof recited in these examples, as well as other conditions and details, should not be construed to unduly limit this invention. In the examples, all parts are parts by weight unless indicated otherwise. All examples were prepared in ambient atmosphere (in the presence of oxygen and water vapor) unless indicated otherwise.

EXAMPLE 1

This example demonstrates the simultaneous curing of ethylenically unsaturated and epoxy monomers in a crosslinkable system. The curable composition consisted of methyl acrylate, cyclohexene oxide and glycidyl acrylate. If only epoxy or acrylate cure were initiated, then this system produced a soluble polymer. If both epoxy and acrylate cure were initiated then a crosslinked insoluble polymer was produced.

Sample preparations were carried out under subdued lights (below the level necessary to initiate polymerization). The polymerizable mixture consisted of 1.0 g glycidyl acrylate, 5.0 methyl acrylate and 5.0 cyclohexene oxide. In all cases there was added to the polymerizable compositions 0.1 g of the desired organometallic salt and 0.1 g diphenyliodonium hexafluorophosphate. A 3 g portion of the composition was placed in a glass vial and irradiated between two 15 watt G.E. daylight fluorescent bulbs using an Ultraviolet Products lamp holder (lamp separation distance 4 cm). The sample was purged with nitrogen for one minute preceding and continuously during photolysis. The irradiation time required to produce a polymer insoluble in chloroform was recorded, and is noted in Table I.

Alternatively, these compositions can be cured thermally or in a two-stage process.

TABLE I

Simultaneous Photoinitiation of Free Radical and Epoxy Cure in a Crosslinkable System

| Compound | Cure Time[a] |
|---|---|
| (eta$^6$-mesitylene)(eta$^5$-cyclopentadienyl)-iron(1+) hexafluorophosphate | 75 |
| (eta$^6$-mesitylene)(eta$^5$-cyclopentadienyl)-iron(1+) hexafluoroantimonate | 70 |
| (eta$^6$-naphthalene)(eta$^5$-cyclopentadienyl)-iron(1+) hexafluorophosphate[b] | 75 |
| (eta$^6$-naphthalene)(eta$^5$-cyclopentadienyl)-iron(1+) hexafluoroantimonate | 60 |
| (eta$^6$-1,2,3,4,4a,9a-(9-cinnamylidenefluorene))-(eta$^5$-cyclopentadienyl)iron(1+) hexafluorophosphate | 300 |
| (eta$^5$-cyclopentadienyl)dicarbonyl-triphenylphosphineiron(1+) hexafluorophosphate | 220 |
| (eta$^5$-cyclopentadienyl)dicarbonyl-triphenylphosphineiron(1+) hexafluoroarsenate | 300 |
| (eta$^5$-cyclopentadienyl)dicarbonyl-triphenylphosphineiron(1+) hexafluoroantimonate | 200 |
| (eta$^5$-cyclopentadienyl)dicarbonyl-triphenylarsineiron(1+) hexafluoroarsenate | 120 |
| (eta$^5$-cyclopentadienyl)dicarbonyl-triphenylarsineiron(1+) hexafluoroantimonate | 135 |
| (eta$^5$-cyclopentadienyl)dicarbonyl-triphenylstibineiron(1+) hexafluoroantimonate | 130 |

[a]Time in seconds to produce insoluble crosslinked system. Diphenyliodonium hexafluorophosphate (comparative) alone under these conditions did not produce a crosslinked system after 20 minutes of irradiation.
[b]0.2 g of gamma-butyrolactone added to completely solubilize this compound.

The data of TABLE I show that bicomponent initiators are efficient curing agents for free radical and epoxy polymerization.

EXAMPLE 2

Curing trials using cationic organometallic salts and onium salts as photoinitiators for free radically cured monomers were conducted in the following manner: exposures were made on a hot plate covered with a large aluminum plate to keep the temperature constant. The light source was a 275 watt Sylvania sunlamp positioned 10 cm above the sample. For free radical polymerization, a stock solution was prepared from of 0.1 g cationic organometallic salt and/or iodonium hexafluorophosphate salt, 0.2 g gamma-butyrolactone, 10 g 1,6-hexanedioldiacrylate. The testing sample consisted of 1 g of the stock solution and 1 g of pentaerythritol tetraacrylate (SR-295 TM, Sartomer Co., West Chester, Pa.). Approximately 0.2 of this sample was placed in individual aluminum containers to evaluate for cure times. The results of these trials are presented in Table II.

TABLE II

Acrylate Cure Times

| Catalyst System | Cure Time[a] |
|---|---|
| (eta[6]-mesitylene)(eta[5]-cyclopentadienyl)-iron(1+) hexafluoroantimonate/IODONIUM | <10 sec |
| IODONIUM (comparative) | >300 sec |
| (eta[5]-cyclopentadienyl)dicarbonyl-triphenylphosphineiron(1+) hexafluoroarsenate/IODONIUM | <30 sec |

[a] at 80° C. in the air
IODONIUM in all Examples is diphenyliodonium hexafluorophosphate Essentially no cure took place when these samples were heated in the dark for 4 hours at 80° C.

EXAMPLE 3

Curing trials using organometallic salts and onium salts as photoinitiators for epoxy monomers were conducted in the following manner: Exposures were made on a hot plate covered with a large aluminum plate to keep the temperature constant. The light source was a 275 watt Sylvania sunlamp positioned 10 cm above the sample. For epoxy cure, the composition consisted on 0.1 g of the organometallic salt and/or 0.1 g of the iodonium salt, 0.2 g gamma-butyrolactone and 10 g of a 1/9, w/w, mixture of polyethylene glycol, m.wt. 400 (Carbowax TM 400, Union Carbide, Danbury, Conn.) and 3,4-epoxycyclohexylmethyl-3,4-lohexanecarboxylate (ERL TM -4221, Union Carbide, Danbury, Conn.). Approximately 0.2 of this sample was placed in individual aluminum containers to evaluate for cure times. The results of these trials are shown in Table III below.

TABLE III

Epoxy Cure Times

| Catalyst System | Cure Time |
|---|---|
| (eta[6]-mesitylene)(eta[5]-cyclopentadienyl)-iron(1+) hexafluoroantimonate (comparative) | >7 min[a] |
| (eta[6]-mesitylene)(eta[5]-cyclopentadienyl)-iron(1+) hexafluoroantimonate/IODONIUM | 7 min[a] |
| IODONIUM (comparative) | >10 min[a] |
| (eta[5]-cyclopentadienyl)dicarbonyl-triphenylphosphineiron(1+) hexafluoroarsenate (comparative) | >30 min[b] |
| (eta[5]-cyclopentadienyl)dicarbonyl-triphenylphosphineiron(1+) hexafluoroarsenate/IODONIUM | 30 min[b] |
| IODONIUM(comparative) | >30 min[b] |

[a] at 90° C. in the air
[b] at 80° C. in the air

Essentially no cure took place when these samples were heated in the dark for 4 hours at 80° C.

As can be seen from the results in Tables II and III, the combination of cationic organometallic salt and onium salt does provide a more efficient photoinitiation system than comparative curing agents while possessing good thermal stability in the dark.

EXAMPLE 4

More quantitative information on the relative activity of the combination organometallic salt and onium salt initiator was obtained from a series of nmr trials carried out to measure the degree of conversion from monomer to polymer. The results of these trials are presented in Table IV below. The trial which produced the results in Table IV was carried out in the following manner: A 1/1, w/w, mixture of methyl acrylate/cyclohexene oxide was prepared. To a 10 g sample of this mixture was added 0.1 g of the desired cationic organometallic salt and/or 0.1 g of diphenyliodonium hexafluorophosphate. In a small vial was placed 2 g of the sample and it was purged with nitrogen for 1 min before and continually during irradiation. The light source was two 15 watt Sylvania daylight fluorescent bulbs. Irradiation time was 3 minutes. Immediately after completion of the photolysis, the nmr was taken in CDCl$_3$. The amount of polymerization was determined by the ratio of the peak intensity of the polymer to that of polymer plus monomer.

TABLE IV

Percent Conversion to Polymer from NMR Study[a]

| Catalyst System | Epoxy | Acrylate |
|---|---|---|
| (eta[6]-mesitylene)(eta[5]-cyclopentadienyl)-iron(1+) hexafluoroantimonate (comparative) | 97.5% | 58.5% |
| (eta[6]-mesitylene)(eta[5]-cyclopentadienyl)-iron(1+) hexafluoroantimonate/IODONIUM | 53.5% | 47.3% |
| (eta[6]-mesitylene)(eta[5]-cyclopentadienyl)-iron(1+) hexafluorophosphate (comparative) | 47.7% | 41.8% |
| (eta[6]-mesitylene)(eta[5]-cyclopentadienyl)-iron(1+) hexafluorophosphate/IONODIUM | 47.6% | 49.1% |
| IODONIUM (comparative) | <0.5% | 5.3% |

[a] Nmrs taken on a 400 MHz instrument

The data in Table IV show that the combination of cationic organometallic salt and onium salt is an efficient photoinitiation system for free radical and epoxy polymerization.

EXAMPLE 5

More quantitative information on the relative activity of this combination of initiators was obtained from a series of nmr trials carried out to measure the degree of conversion from monomer to polymer. The results of these trials are presented in Table V below. The trial which produced the results in Table V was carried out in the following manner: A 1/1, w/w, mixture of methyl acrylate/cyclohexeneoxide was prepared. To a 5.0 g sample of this mixture was added 0.046 g of the desired cationic orgnaometallic salt and/or 0.030 g of diphenyliodonium hexafluorophosphate. In a small vial was placed 1 g of the sample and it was purged with nitrogen for 1 min before and continually during irradiation. The light source was two 15 watt G.E. blacklite bulbs. Irradiation time was 4 minutes. Immediately after completion of the photolysis, the nmr was taken in DCDl$_3$. The amount of polymerization was determined by the ratio of the peak intensity of the polymer to that of polymer plus monomer.

TABLE V

Percent Conversion to Polymer from NMR Study[a]

| Catalyst System | Epoxy | Acrylate |
|---|---|---|
| (eta[5]-cyclopentadienyl)dicarbonyl-triphenylphosphineiron(1+) hexafluoroarsenate (comparative) | 26% | 28% |
| (eta[5]-cyclopentadienyl)dicarbonyl-triphenylphosphineiron(1+) hexafluoroarsenate/IODONIUM | 35% | 36% |
| IODONIUM (comparative) | 22% | 27% |

[a] Nmrs taken on a 400 MHz instrument

The data in Table V show that the combination of cationic organometallic salt and onium salt is an efficient photoinitiation system for free radical and epoxy polymerization.

EXAMPLE 6

This example demonstrates the simultaneous photocuring of two-part polyurethanes and acrylates.

A stock solution was prepared containing 1.5 parts hexane diisocyanate (Aldrich Chemical Co., Milwaukee, Wis.), 3.5 g poly(ethylene glycol) (Carbowax TM 400, Union Carbide, Danbury, Conn., molecular weight 400), and 5 parts distilled methyl acrylate (Aldrich). Four samples were prepared from 1.1 g stock solution and initiator combination shown in TABLE VI below. Sample 1 was left in the dark at room temperature. Samples 2, 3, and 4 were placed in a water bath at 73°±1° C., and irradiated with a Kodak Carousel TM Projector containing a 360 nm cutoff filter for 5.0 minutes. The samples were left in the water bath in the dark for an additional 2.0 minutes, then analyzed for percent conversion of monomer to polymer by 400 MHz $^1$H nmr. The results are listed in Table VI below.

TABLE VI

Dual Cure of Urethane and Acrylate
Composition: Percent Conversion from NMR Study

| Sample No. | Photocatalyst (weight %) | Urethane | Acrylate |
|---|---|---|---|
| 1 | None (0%) (comparative) | 0% | 0% |
| 2 | IODONIUM (1%) (comparative) | 0% | 2% |
| 3 | (eta$^6$-mesitylene)(eta$^5$-cyclopentadienyl)iron(1+) hexafluorophosphate (1%)/ IODONIUM (1%) | 94% | 54% |
| 4 | (eta$^6$-mesitylene)(eta$^5$-cyclopentadienyl)iron(1+) hexafluorophosphate (1%) (comparative) | 76% | 32% |

The data of TABLE VI show that two-component curing agents are efficient initiators for the combination free radical and polyurethane precursor compositions.

EXAMPLE 7

A stock solution was prepared from of 2 parts hexane diisocyanate, 3.5 parts poly(ethylene glycol) (molecular weight 400), 5 parts methyl acrylate, and 0.3 parts hydroxyethyl acrylate (Aldrich Chemical Co.). To 3.0 aliquots was added sufficient photocatalyst to reach the concentration shown in TABLE VII. Samples were placed in an open vial in a water bath maintained at 70°±2° C. and irradiated using a Kodak TM Carousel TM projector containing a 360 nm cutoff filter at a distance of 16 cm. At 1 minute intervals aliquots (¼ ml) of the irradiated sample were added to ½ ml chloroform with stirring. The gel time was the earliest time at which the aliquot failed to dissolve in the chloroform, and is recorded in TABLE VII below

TABLE VII

| Gel times for Dual Curing Systems | |
|---|---|
| Catalyst (wgt. %) | Gel Time |
| (eta$^6$-mesitylene)(eta$^5$-cyclopentadienyl) iron(1+) hexafluorophosphate (1%)/IODONIUM (1%) | 7 min |
| (eta$^6$-mesitylene)(eta$^5$-cyclopentadienyl-iron(1+) mexafluorophosphate (1%)(comparative) | 9 min |
| IODONIUM (1%)(comparative) | >20 min |
| (eta$^5$-cyclopentadienyl)dicarbonyl-triphenylphosphineiron(1+) hexafluorophosphate (1%)/IODONIUM (1%) | 4–5 min |
| (eta$^5$-cyclopentadienyl)dicarbonyl-triphenylphosphineiron(1+) hexafluorophosphate (1%) (comparative) | 10 min |

The data of TABLE VII show that the two-component curing agent is a more efficient photoinitiation system than comparative curing agents.

EXAMPLE 8

A stock solution of 1.5 parts hexane diisocyanate and 3.5 parts poly(ethylene glycol) (molecular weight 400) was prepared. To 1.0 g samples in open vials was added sufficient photocatalyst to reach the concentration shown in TABLE VIII below. Each sample was placed in a water bath at 75° C. and irradiated using a Kodak Carousel projector with a 360 nm cutoff filter. Cure times (solidification times) are shown in TABLE VIII.

TABLE VIII

| Photocatalyst | Cure Time |
|---|---|
| (eta$^6$-mesitylene)(eta$^5$-cyclopentadienyl)-iron(1+) hexafluorophosphate (1%)/IODONIUM (1%) | 3 min |
| (eta$^6$-mesitylene)(eta$^5$-cyclopentadienyl)-iron(1+) hexafluorophosphate (1%) (comparative) | 5 min |
| (eta$^5$-cyclopentadienyl)dicarbonyl-triphenylphosphineiron(1+) hexafluorophosphate (1%)/IODONIUM (1%) | 9 min |
| (eta$^5$-cyclopentadienyl)dicarbonyl-triphenylphosphineiron(1+) hexafluorophosphate (1%) (comparative) | 10 min |

The data of TABLE VIII show that the two-component curing agent is a more efficient photoinitiation system than comparative curing agents.

Various modifications and alterations of this invention will become apparent to those skilled in the art without departing from the scope and spirit of this invention, and it should be understood that this invention is not to be unduly limited to the illustrative embodiments set forth herein.

We claim:
1. A method comprising the steps of:
(a) providing a mixture comprising a polymeric precursor composition selected from the group consisting of
(1) at least one di- and polysiocyanates, and at least one compound bearing at least two isocyanate-reactive hydrogen aotms, the isocyanate and reactive hydrogen-containing compound constituting polyurethane precursors, and
(2) at least one ethylenically-unsaturated compound, at least one isocyanate selected from di- and polyisocyanates, and at least one compound bearing at least two isocyanate-reactive hydrogen atoms, the isocyanate and reactive hydrogen-containing compound constituting polyurethane precursors, and
a catalytically effective amount of a two-component curing agent for (1) and (2) comprising
(1) an organometallic salt, and
(2) an onium salt;
(b) allowing said mixture to polymerize or adding energy to said mixture to effect polymerization.

2. The method according to claim 1 wherein said energy is at least one of electromagnetic radiation, accelerated particles, or thermal energy.

3. The method according to claim 1 wherein said polymerization is effected in two stages, the first stage involving radiation and the second step involving thermal cure.

4. The method composition according to claim 1 wherein said organometallic salt has the formula:

I wherein M represents the same or different metals selected from the elements of Periodic Groups IVB, VB, VIB, VIIB, and VIIIB; with the proviso that Formula I can represent an organometallic salt having a mono- or bimetallic cation;

- $L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;
- $L^2$ represent none or 1 to 6 ligands contributing an even number of sigma-electrons that can be the same or different selected from mono-, di-, and tri-dentate ligands, each contributing 2, 4, or 6 sigma-electrons to the valence shell of M;
- $L^3$ represents none, 1 or 2 bridging ligands pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 2 to 24 pi-electrons to the valence shells of two metal atoms simultaneously;
- $L^4$ represents none, 1, 2 or 3 bridging ligands contributing an even number of sigma-electrons that can be the same or different selected from mono, di, and tri-dentate ligands, each donating 2, 4, or 6 sigma-electrons to the valence shells of two M simultaneously;

with the proviso that the total electronic charge contributed to M by the ligands $L^1$, $L^2$, $L^3$ and $L^4$ plus the product of ionic charge on M with b results in a residual net positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer of 1 or 2, the number of anions required to neutralize the charge e on the cation.

5. The method according to claim 4 wherein
  (a) the ligand $L^1$ is provided by a monomeric or polymeric compound having an accessible unsaturated group, and contains less than 100 carbon atoms and up to 10 hetero atoms selected from the group consisting of nitrogen, sulfur, non-peroxidic oxygen, phosphorus, arsenic, selenium, antimony, tellurium, silicon, germanium, tin, and boron,
  (b) the ligand $L^2$ is selected from:
    (1) monodentate ligands having up to 30 carbon atoms and up to 10 hetero atoms selected from the group consisting of nitrogen, sulfur, non-peroxidic oxygen, phosphorus, arsenic, selenium, antimony, tellurium, and
    (2)/ polydentate ligands capable of forming with metal M a 4-, 5-, or 6-membered saturated or unsaturated ring containing up to 30 carbon atoms and up to /10 hetero atoms selected from the group consisting of nitrogen sulfur, non-peroxidic oxygen, phosphorus, arsenic, selenium, antimony, tellurium, in addition to the metal atom;
  (c) the ligand $L^3$ of the ionic salt each is provided by a monomeric or polymeric compound, has an accessible unsaturated group and has up to 30 carbon atoms and up to 10 hetero atoms selected from the group consisting of nitrogen, sulfur, non-peroxidic oxygen, phosphorus, arsenic, selenium, antimony, tellurium, silicon, germanium, tin, and boron; and
  (d) the bridging ligand $L^4$ of the ionic salt is provided by monodentate and polydentate compound which contains less than 100 carbon atoms and up to 10 hetero atoms selected from the group consisting of nitrogen, sulfur, non-peroxidic oxygen, nitrogen, phosphorus, arsenic, selenium, antimony and tellurium.

6. The method according to claim 5 wherein the ligand $L^1$ is substituted by a group selected from the group consisting of hydrocarbyl, hydrocarbyloxy, hydrocarbylmercapto, hydrocarbylcarbonyloxy, hydrocarbylcarbonyl, hydrocarbylcarbonamido, azo, boryl, halo, hydroxy, cyano, nitro, nitroso, oxo, dimethylamino, diphenylphosphino, diphenylarsino, diphenylstibine, tributyltin, methylseleno, ethyltelluro, trimethylsiloxy, and condensed rings, said group containing up to 30 carbon atoms and up to 10 hetero atoms selected from the group consisting of nitrogen, sulfur, non-periodic oxygen, nitrogen, sulfur, oxygen, phosphorous, arsenic, selenium, antimony, tellurium, silicon, germanium, tin, and boron.

7. The method according to claim 1 wherein said salt has the formula:

$$[(L^5)(L^6)M]^{+e}X_f \qquad \text{II}$$

wherein
  M represents a metal selected from the group consisting of elements of the Periodic Groups IVB, VB, VIB, VIIB, and VIIIB;
  $L^5$ represents none, one, or two pi-electron contributing ligands that can be the same or different ligand selected from the same groups of ligands as $L^1$ of formula I;
  $L^6$ represents none or 1 to 6 ligands that can be the same or different ligand, contributing an even number of sigma-electrons selected from the same groups of ligands as $L^2$ of formula I;
with the proviso that the total electronic charge contributed to M by $L^5$ and $L^6$ plus the ionic charge on M results in a residual net positive charge of e to the complex; and e, f, and X have the same definition as defined in claim 3.

8. The method according to claim 7 wherein ligand $L^5$ of the ionic salt contains less than 100 carbon atoms and up to 10 hetero atoms selected from the group consisting of nitrogen, sulfur, non-peroxidic oxygen, phosphorus, arsenic, selenium, antimony, tellurium, silicon, germanium, tin, and boron; and ligand $L^6$ of the ionic salt is selected from:
  (a) monodentate ligands having up to 30 carbon atoms and up to 10 hetero atoms selected from the group consisting of nitrogen, sulfur, oxygen, phosphorus, arsenic, selenium, antimony, and tellurium, and
  (b) polydentate ligands capable of forming with metal M a 4-, 5-, or 6-membered saturated or unsaturated ring containing up to 30 carbon atoms and up to 10 hetero atoms selected from the group consisting of nitrogen, sulfur, non-peroxidic oxygen, phosphorus, arsenic, selenium, antimony, and tellurium.

9. The method according to claim 8 wherein ligand $L^5$ is substituted by a group selected from hydrocarbyl, hydrocarbyloxy, hydrocarbylmercapto, hydrocarbyloxycarbonyl, hydrocarbylcarbonyl, hydrocarbylcarbonamido, phenyl, azo, boryl, halo, hydroxy, cyano, nitro, nitroso, oxo, dimethylamino, diphenylphosphino, diphenylarsino, diphenylstibine, tributyltin, methylseleno, ethylselluro, trimethylsiloxy, and condensed rings, said group containing up to 30 carbon toms and up to 10 hetero atoms selected from the group consisting of nitrogen, sulfur, non-peroxidic oxygen, phosphorus, arsenic, selenium, antimony, tellurium, silicon, germanium, tin, and boron.

10. The method according to claim 1, wherein said bicomponent curing agent is present in an amount sufficient to effect polymerization.

11. The method according to claim 1 wherein said onium salt has the formula III $$AY \qquad \qquad III$$

wherein A is an iodonium, sulfonium, or diazonium cation, and

Y is an organic sulfonate counterion, or a halogen-containing metal or metalloid counterion.

12. The method according to claim 1 wherein said two-component curing agent is present in the range of 0.01 to 20 weight percent of the total composition.

13. The method according to claim 12 wherein said two-component curing agent is present in the range of 0.1 to 10 weight percent of said total composition.

14. The method according to claim 1 wherein the ratio of organometallic compound to onium salt of said curing agent is in the range of 10:1 to 1:10 by weight.

15. The method according to claim 1 wherein the ratio of organometallic salt to onium salt is in the range of 5:1 to 1:5 by weight.

16. The method according to claim 1, wherein said ethylenically-unsaturated monomer is selected from the group consisting of acrylates, acrylamides, vinyl compounds, and bireactive monomers.

17. The method according to claim 16 wherein said ethylenically-unsaturated monomer is an acrylate or methacrylate.

18. The method according to claim 1 wherein said polymeric precursor is at least one ethylenically-unsaturated compound, at least one isocyanate selected from di- and polyisocyanates, and at least one compound bearing at least two isocyanate-reactive hydrogen atoms, the isocyanate and reactive hydrogen-containing compound constituting polyurethane precursors.

19. The method according to claim 1 wherein said polyurethane precursors comprise a mixture of polyisocyanates and compounds bearing at least two isocyanate-reactive hydrogen atoms where the ratio of isocyanate groups to isocyanate-reactive hydrogen atoms is in the range 1:2 to 2:1.

20. The method according to claim 1 wherein said organometallic compound is selected from the group consisting of (eta$^6$-mesitylene)(eta$^5$-cyclopentadienyl)iron(1+) hexafluoroantimonate, (eta$^6$-mesitylene)-(eta$^5$-cyclopentadienyl)iron(1+) hexafluorophosphate, (eta$^6$-naphthalene)(eta$^5$-cyclopentadienyl)iron(1+), hexafluoroantimonate, (eta$^6$-naphthalene)(eta$^5$-cyclopentadienyl)iron(1+)hexafluoro phosphate, (eta$^5$-cyclopentadienyl)dicarbonyltriphenylphosphineiron(1+) hexafluorophosphate, and (eta$^5$-cyclopentadienyl)dicarbonyl-triphenylphosphineiron(1+) hexafluoroantimonate.

21. The method according to claim 1 wherein said onium salt is at least one of Ph$_2$I$^+$PF$_6^-$, Ph$_3$I$^+$SbF$_6^-$, Ph$_2$I$^+$AsF$_6^-$, Ph$_2$I$^+$SbF$_5$(OH)$^-$, Ph$_3$S$^+$PF$_6^-$, Ph$_2$S$^+$SbF$_6^-$, Ph$_3$S$^+$AsF$_6^-$, PhSC$_6$H$_4$SPh$_2$$^{+SbF_6-}$, and Ph$_3$S$^+$SbF$_5$(OH)$^-$, wherein Ph is phenyl.

22. The method according to claim 1 wherein said polymerizable mixture further comprises up to 90 weight percent of a solvent based on the total mixture.

23. A polymerizable composition comprising a polymeric precursor selected from one of the groups consisting of
(1) at least one isocyanate selected from di- and polyisocyanates, and at least one compound bearing at least two isocyanate-reactive hydrogen atoms, the isocyanate and reactive hydrogen-containing compound constituting polyurethane precursors, and
(2) at least one ethylenically-unsaturated monomer, at least one isocyanate selected from di- and polyisocyanates, and at least one compound bearing at least two isocyanate-reactive hydrogen atoms, the isocyanate and reactive hydrogen-containing compound constituting polyurethane precursors, and a two-component curing agent for (1) and (2) comprising an organometallic salt and an onium salt.

24. The composition according to claim 23 which is at least on of photopolymerizable, accelerated particle polymerizable, and thermally polymerizable.

25. The composition according to claim 23 wherein said polymeric precursors are selected from the group consisting of said polyurethane precursors.

26. The composition according to claim 23 wherein said organometallic salt is an organometallic iron salt.

27. The composition according to claim 23 wherein said salt is present in an amount in the range of 0.01 to 20 weight percent of said polymerizable composition.

28. The composition according to claim 23 wherein said salt is present in an amount in the range of 0.1 to 10 weight percent of said polymerizable composition.

29. The composition according to claim 23 which has been subjected to sufficient energy to effect polymerization and provide a cured composition.

30. The composition according to claim 23 wherein said polyisocyanate is an aliphatic, cycloaliphatic, araliphatic, aromatic, or heterocyclic polyisocyanate, or any combination thereof.

31. The composition according to claim 23 wherein said polyurethane precursor is at least one polyisocyanate and at least one polyol or other isocyanate-reactive group bearing at least two isocyanate-reactive groups.

32. The composition according to claim 23 wherein said polyisocyanate has the formula $$Q(NCO)_n$$

wherein n=an integer 2 to 4 and

Q=represents an aliphatic hydrocarbon radical containing from 2 to 100 carbon atoms, and zero to 50 heteroatoms, a cycloaliphatic hydrocarbon radical containing from 4 to 100 carbon atoms and zero to 50 heteroatoms, an aromatic hydrocarbon radical or heterocyclic aromatic radical containing from 6 to 15 carbon atoms and zero to 10 heteroatoms, or an araliphatic hydrocarbon radical containing from 8 to 100 carbon atoms and zero to 50 heteroatoms, wherein the heteroatoms in all of the radicals are selected from the group consisting of non-peroxidic oxygen, sulfur, non-amino nitrogen, halogen, silicon, and non-phosphine phosphorus.

33. A cured composition prepared according to the method of claim 1 wherein said di- and polyisocyanates have reactive functionality consisting essentially of socyanate groups, and said at least one other polyurethane precursor has reactive functionality consisting essentially of at least two isocyanate-reactive hydrogen atoms.

34. A shaped article according to claim 33.

35. A layered structure comprising a substrate having coated on at least one surface thereof the polymerizable composition according to claim 23.

36. The cured structure according to claim 35 wherein said di- and polyisocyanates have reactive functionality consisting essentially of isocyanate groups, and said at least one other polyurethane precursor has reactive functionality consisting essentially of at least two isocyanate-reactive hydrogen atoms.

37. The layered structure according to claim 35 which is an imageable structure.

38. The composition according to claim 23 further comprising an effective amount of a photosensitizer.

39. The method according to claim 1 wherein said at least one ethylenically-unsaturated monomer as disclosed in (a) (2) comprises at least one ethylenically-unsaturated monomer and at least one bireactive monomer different from said ethylenically-unsaturated monomer.

40. The composition according to claim 23 wherein said ethylenically-unsaturated monomer is selected from the group consisting of acrylates, acrylamides, vinyl compounds, and bireactive monomers.

41. The composition according to claim 23 wherein said at least one ethylenically-unsaturated monomer as disclosed in (2) comprises at least one ethylenically-unsaturated monomer and at least one bireactive monomer different from said ethylenically-unsaturated monomer.

42. The composition according to claim 23 wherein said polymeric precursor comprises at least one ethylenically-unsaturated compound, at least one isocyanate selected from di- and polyisocyanates, and at least one compound bearing at least two isocyanate-reactive hydrogen atoms, the isocyanate and reactive hydrogen-containing compound constituting polyurethane precursors.

* * * * *